US010742605B2

(12) United States Patent
Pickover et al.

(10) Patent No.: US 10,742,605 B2
(45) Date of Patent: Aug. 11, 2020

(54) CONTEXT-BASED FIREWALL FOR LEARNING ARTIFICIAL INTELLIGENCE ENTITIES

(71) Applicant: International Business Machines Corporation, Armonk, NY (US)

(72) Inventors: Clifford A. Pickover, Yorktown Heights, NY (US); Komminist Weldemariam, Nairobi (KE); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 15/973,853

(22) Filed: May 8, 2018

(65) Prior Publication Data
US 2019/0349333 A1    Nov. 14, 2019

(51) Int. Cl.
*H04L 29/06* (2006.01)
*G06N 5/02* (2006.01)
*G06N 20/00* (2019.01)
*G06N 3/02* (2006.01)

(52) U.S. Cl.
CPC .......... *H04L 63/0245* (2013.01); *G06N 3/02* (2013.01); *G06N 5/02* (2013.01); *G06N 20/00* (2019.01); *H04L 63/0263* (2013.01)

(58) Field of Classification Search
None
See application file for complete search history.

(56) References Cited

U.S. PATENT DOCUMENTS

| 6,829,613 | B1 | 12/2004 | Liddy |
| 8,434,126 | B1 | 4/2013 | Schepis et al. |
| 8,978,133 | B2 | 3/2015 | Beaufrere et al. |
| 9,009,045 | B1 | 4/2015 | Larsen et al. |
| 10,432,648 | B1 * | 10/2019 | Xu .................. H04L 63/145 |
| 2010/0162342 | A1 | 6/2010 | Piepenbrink et al. |
| 2012/0278264 | A1 | 11/2012 | Deyo |
| 2012/0324565 | A1 * | 12/2012 | Cohen ................. G06F 3/011 726/12 |
| 2015/0254555 | A1 | 9/2015 | Williams et al. |

(Continued)

OTHER PUBLICATIONS

Tay (bot), Wikipedia, accessed Mar. 14, 2018, 5 pages. https://en.wikipedia.org/wiki/Tay_(bot).

(Continued)

*Primary Examiner* — Andrew J Steinle
(74) *Attorney, Agent, or Firm* — Yee & Associates, P.C.

(57) ABSTRACT

Detecting and blocking content that can develop undesired behavior by artificial intelligence (AI) entities toward users during a learning process is provided. Input information is received for a set of one or more AI entities. Characteristics of the input information are evaluated based on rules of a selected policy from a set of policies and learned characteristics of information associated with a corpus of information. It is determined whether a result of evaluating the characteristics of the input information exceeds a predefined threshold. In response to determining that the result of evaluating the characteristics of the input information exceeds the predefined threshold, the input information for the set of AI entities is filtered by performing a selective filtering action, using a firewall, based on context of the input information.

20 Claims, 7 Drawing Sheets

(56) References Cited

U.S. PATENT DOCUMENTS

2015/0324352 A1* 11/2015 Meyer .................... G06F 40/30
 382/103
2017/0147682 A1* 5/2017 Alaqeeli ............. G06F 16/3344

OTHER PUBLICATIONS

"Personality Insights", IBM Watson, accessed Mar. 14, 2018, 5 pages. https://www.ibm.com/watson/services/personality-insights/.

Garcia, "How to Keep Your AI From Turning in to a Racist Monster", Wired, Feb. 13, 2017, 9 pages. https://www.wired.com/2017/02/keep-ai-turning-racist-monster/.

Vincent, "Twitter taught Microsoft's AI chatbot to be a racist asshole in less than a day", The Verge, Mar. 24, 2016, 6 pages. https://www.theverge.com/2016/3/24/11297050/tay-microsoft-chatbot-racist.

"Tone Analyzer", IBM Watson Developer Cloud, accessed Mar. 14, 2018, 1 page. https://tone-analyzer-demo.ng.bluemix.net/.

Recasens et al., "Linguistic Models for Analyzing and Detecting Biased Language", Proceedings of the 51st Annual Meeting of the Association for Computational Linguistics, Aug. 2013, 10 pages.

Best, "Can a computer tell if you're a RACIST? Algorithm can detect hidden prejudice from a person's body language", Daily Mail, Sep. 29, 2016, 4 pages. http://www.dailymail.co.uk/sciencetech/article-3813425/Can-computer-tell-RACIST-Algorithm-detect-hidden-prejudice-person-s-body-language.html.

Tait, "The rise of racist robots", New Statesman, Oct. 20, 2016, 5 pages. https://www.newstatesman.com/science-tech/future-proof/2016/10/rise-racist-robots.

Gershgorn, "Here's How We Prevent the Next Racist Chatbot", Popular Science, Mar. 24, 2016, 4 pages. https://www.popsci.com/heres-how-we-prevent-next-racist-chatbot.

* cited by examiner

CONTEXT-BASED FIREWALL FOR LEARNING ARTIFICIAL INTELLIGENCE ENTITIES

BACKGROUND

1. Field

The disclosure relates generally to artificial intelligence and more specifically to providing a filtering action by a firewall to prevent information from being received by a learning artificial intelligence entity based on the firewall determining that characteristics of the information are inappropriate or offensive in nature and should not be learned by the artificial intelligence entity.

2. Description of the Related Art

Artificial intelligence (AI) is the ability of a computer or computer-controlled robot to perform tasks commonly associated with intelligent beings. Artificial intelligence is frequently applied to systems endowed with intellectual processes, which are characteristic of humans, such as an ability to reason, discover meaning, generalize, and learn from past experience. Since the development of computers, it has been demonstrated that computers can be programmed to carry out very complex tasks, such as, for example, discovering proofs for mathematical theorems or playing chess. However, despite continuing advances in computer processing speed and memory capacity, no programs currently exist that can match human flexibility over wider domains or in tasks requiring everyday knowledge. On the other hand, some programs have attained the performance levels of human experts in performing certain tasks so that AI is found in applications, such as, for example, medical diagnosis, search engines, and voice or handwriting recognition.

A number of different forms of learning are applied to AI. The simplest form is learning by trial and error. For example, a computer program for solving chess problems may try moves at random until checkmate is found. The program may then store the solution along with chess piece positions so that the next time the computer encounters the same piece positions it would recall the solution. A more challenging problem is implementing what is called learning by generalization. Generalization involves applying past experience to analogous new situations. For example, a program that learns the past tense of regular English verbs by rote will not be able to produce the past tense of a word, such as jump, unless it previously had been presented with the word jumped. However, a program that is able to generalize can learn the add "ed" rule and so form the past tense of jump based on experience with similar verbs.

In addition, computer programs may be written that are able to respond in a human language to questions and statements. Although none of these programs actually understands language, they may, in principle, reach a point where their command of a language is indistinguishable from that of a normal human.

SUMMARY

According to one illustrative embodiment, a computer-implemented method for detecting and blocking content that can develop undesired behavior by artificial intelligence (AI) entities toward users during a learning process is provided. A computer receives input information for a set of one or more AI entities. The computer evaluates characteristics of the input information based on rules of a selected policy from a set of policies and learned characteristics of information associated with a corpus of information. The computer determines whether a result of evaluating the characteristics of the input information exceeds a predefined threshold. In response to the computer determining that the result of evaluating the characteristics of the input information exceeds the predefined threshold, the computer, using a firewall, filters the input information for the set of AI entities by performing a selective filtering action based on context of the input information. According to other illustrative embodiments, a computer system and computer program product for detecting and blocking content that can develop undesired behavior by artificial intelligence (AI) entities toward users during a learning process are provided.

DETAILED DESCRIPTION

Figure 1:
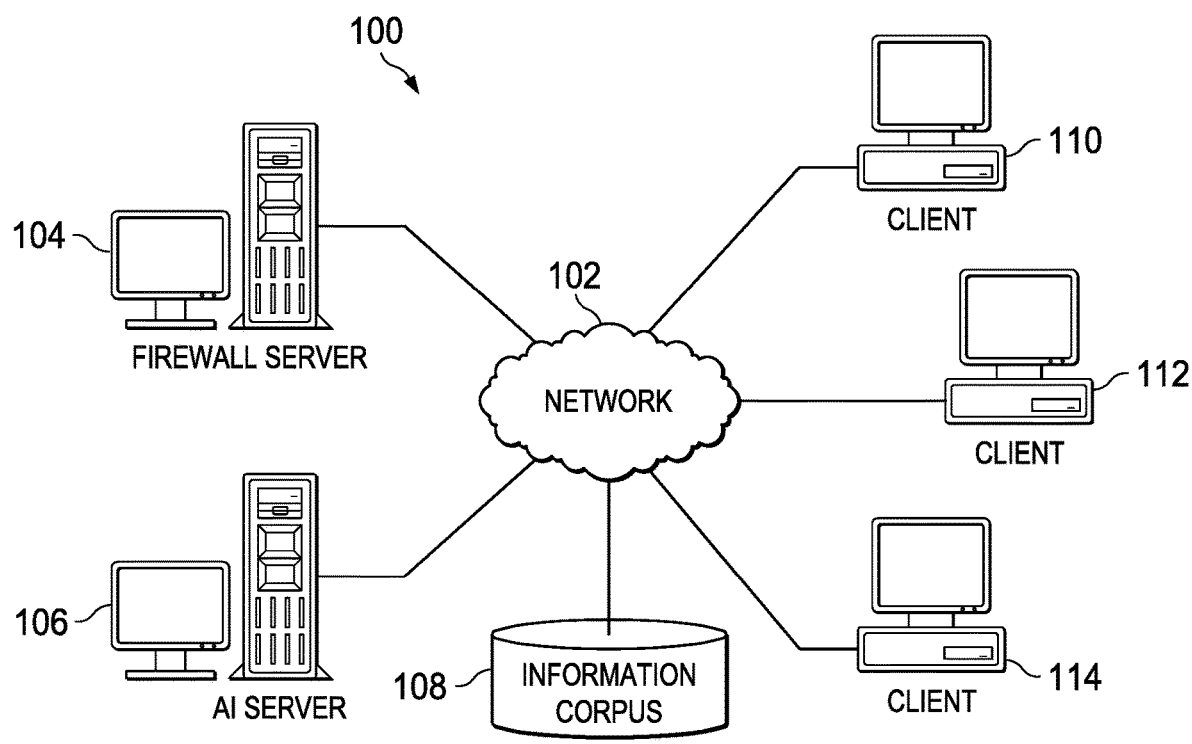
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
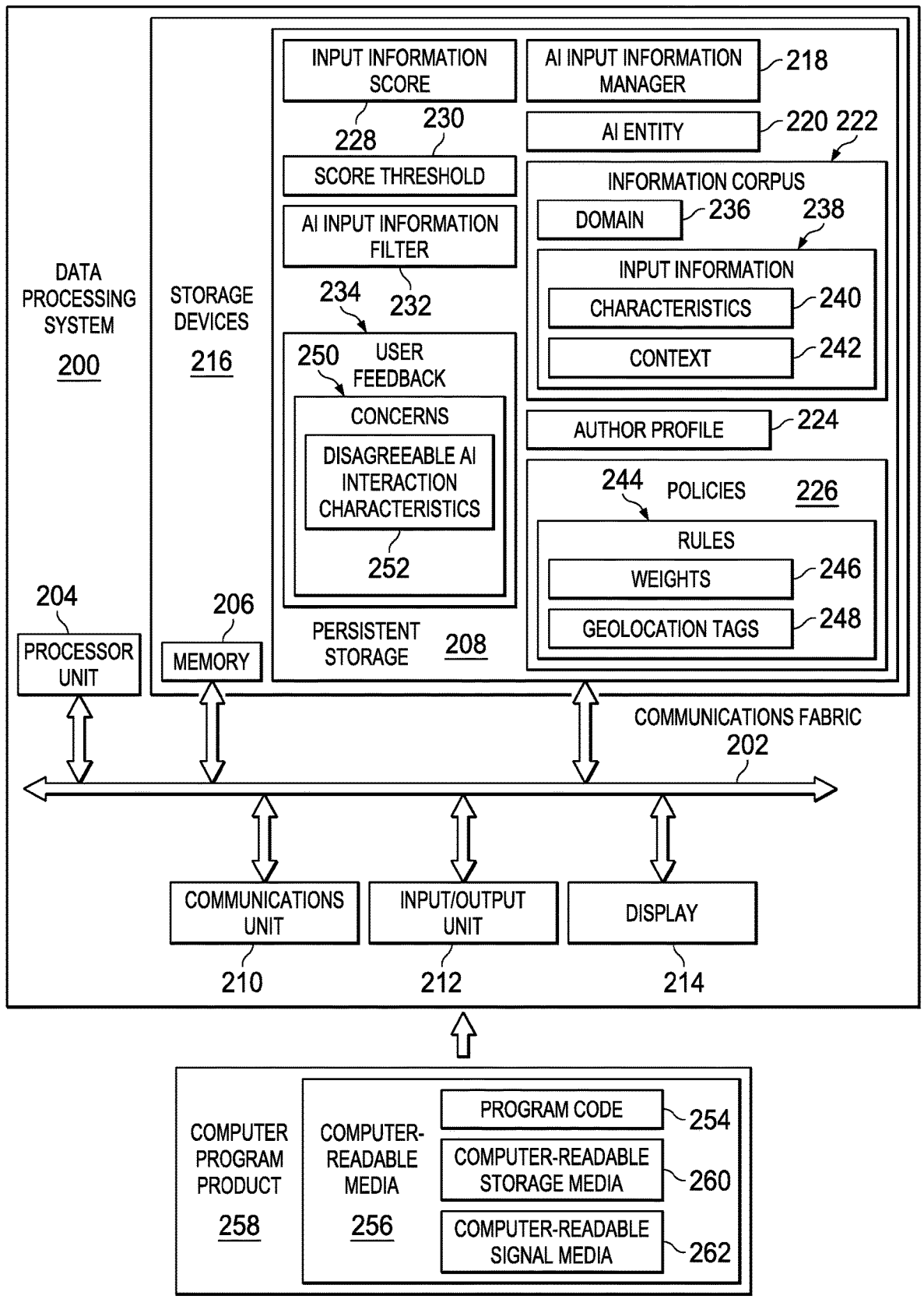
FIG. 2 is a diagram of a data processing system in which illustrative embodiments may be implemented.
Figure 3:
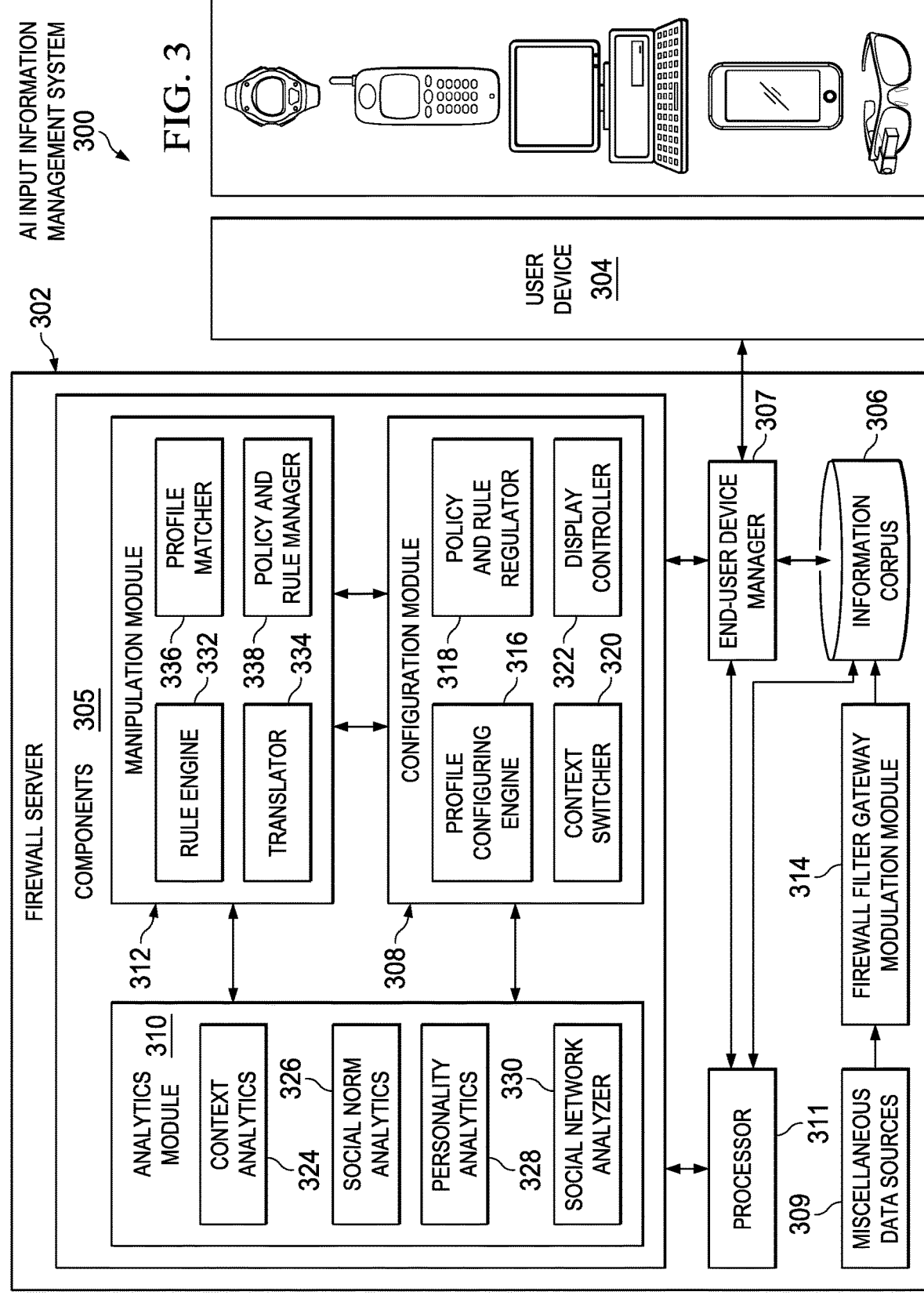
FIG. 3 is a diagram illustrating an example of an artificial intelligence (AI) input information management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 is a firewall server and server 106 is an artificial intelligence (AI) server. It should be noted that firewall server 104 and AI server 106 may each represent a set of one or more computers. Further, firewall server 104 and AI server 106 may be computers in a data center. Alternatively, firewall server 104 and AI server 106 may be computing nodes in a cloud environment.

Firewall server 104 controls the process of filtering inappropriate or offensive information from being received by AI server 106 based on determining that characteristics of the information are inappropriate or offensive in nature and should not be learned by AI server 106. Artificial intelligence server 106 is an AI entity that provides a set of one or more AI services to registered client devices.

Client 110, client 112, and client 114 also connect to network 102. Clients 110, 112, and 114 are registered clients of AI server 106. Users of clients 110, 112, and 114 may utilize clients 110, 112, and 114 to access the AI services provided by AI server 106. In this example, clients 110, 112, and 114 are shown as desktop or personal computers with wire communication links to network 102. However, it should be noted clients 110, 112, and 114 may represent other types of data processing systems, such as, for example, laptop computers, handheld computers, smart phones, smart watches, smart televisions, gaming devices, kiosks, and the like, with wire or wireless communication links to network 102.

Information corpus 108 represents a network storage device capable of storing any type of data in a structured format or an unstructured format. In addition, information corpus 108 may represent a plurality of network storage devices that store a body of information for each of a plurality of different domains. Further, storage 108 may store other types of data, such as authentication or credential data that may include user names, passwords, and biometric data associated with system administrators, for example.

In addition, it should be noted that network data processing system 100 may include any number of additional servers, client devices, storage devices, and other devices not shown. Program code located in network data processing system 100 may be stored on a computer readable storage medium and downloaded to a computer or other data processing device for use. For example, program code may be stored on a computer readable storage medium on AI server 106 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as firewall server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores AI input information manager 218. However, it should be noted that even though AI input information manager 218 is illustrated as residing in persistent storage 208, in an alternative illustrative embodiment AI input information manager 218 may be a separate component of data processing system 200. For example, AI input information manager 218 may be a hardware component coupled to communication fabric 202 or a combination of hardware and software components. In another alternative illustrative embodiment, a first portion of AI input information manager 218 may be located on data processing system 200 and a second portion of AI input information manager 218 may be located on a second data processing system, such as, AI server 106 in FIG. 1. In yet another alternative illustrative embodiment, AI input information manager 218 may be located in the AI server instead of, or in addition to, data processing system 200.

Artificial intelligence input information manager 218 acts as a firewall during a learning process to provide a filtering action to detect content that can develop undesired behavior by AI entity 220 toward users and block that content from being received by AI entity 220 based on AI input information manager 218 determining that characteristics of the content are inappropriate or offensive in nature and should not be learned by AI entity 220. Artificial intelligence entity 220 represents an identifier of the AI entity, along with a list of attributes, such as name, type, hardware, software, abilities, functions, services, and the like, corresponding to the AI entity. Also, it should be noted that AI entity 220 may represent a set of one or more AI entities.

In this example, persistent storage 208 also stores information corpus 222, author profile 224, policies 226, input information score 228, score threshold 230, AI input information filter 232, and user feedback 234. Information corpus 222 represents an identifier for an information corpus storage device, such as information corpus 108 in FIG. 1, along with an identification of the type of data contained in information corpus 222. For example, information corpus 222 includes domain 236. Domain 236 identifies the field or area of knowledge contained in information corpus 222. Input information 238 represents all or a portion of information corpus 222 that is to be provided to AI entity 220 for learning. Characteristics 240 represent qualities, such as, for example, tone, sentiment, emotion, personality, bias, language expression, and the like, expressed in input information 238. Context 242 identifies circumstances, such as author, time, location, and the like, corresponding to input information 238.

Author profile 224 represents a stored profile corresponding to the author of input information 238. Author profile 224 may include, for example, name, residence, affiliations, memberships, family, friends, publications, lectures, field of expertise, job, and the like. Artificial intelligence input information manager 218 may generate author profile 224 based on data and profiles retrieved from online sources, for example.

Policies 226 represent a set of one or more policies corresponding to domain 236 and/or context 242. Policies 226 include rules 244. Rules 244 are a set of one or more defined filtering rules corresponding to input information 238. Artificial intelligence input information manager 218 may assign weights 246 to rules 244. For example, if a rule corresponds to a highly offensive or negative characteristic of input information 238, then AI input information manager 218 assigns an increased weight to that particular rule for filtering purposes. Further, AI input information manager 218 may assign geolocation tags 248 to rules 244. For example, if a rule that corresponds to input information 238 originating from a particular country or region, then AI input information manager 218 may assign a geolocation tag to that particular rule identifying that particular country or region for filtering purposes.

Furthermore, AI input information manager 218 generates input information score 228, which corresponds to input information 238, based on policies 226 and associated rules 244 corresponding to input information 238. Afterward, AI input information manager 218 compares input information score 228 to score threshold 230. Score threshold 230 represents a predefined score threshold value. If input information score 228 is less than or equal to score threshold 230, then AI input information manager 218 allows AI entity 220 to receive input information 238. If input information score 228 is greater than score threshold 230, then AI input information manager 218 utilizes AI input information filter 232 to filter input information 238 to AI entity 220. Artificial intelligence input information filter 232 may prevent all of input information 238 from being received by AI entity 220 or may selectively filter input information 238 based on context 242 and rules 244.

Moreover, AI input information manager 218 may receive user feedback 234. User feedback 234 represents feedback from a client device user regarding interaction with AI entity 220. User feedback 234 may be positive feedback or negative feedback. In this example, user feedback 234 contains concerns 250. Concerns 250 correspond to the client device user providing user feedback 234. Concerns 250 represent aspects of the interaction with AI entity 220 that the client device user found inappropriate or offensive. Concerns 250 may include disagreeable AI interaction characteristics 252. Disagreeable AI interaction characteristics 252 are those characteristics identified by the client device user as being disagreeable to the user during the interaction with AI entity 220. Artificial intelligence input information manager 218 may modify rules 244 or may generate new rules based on user feedback 234. Artificial intelligence input information manager 218 may modify rules 244 by, for example, increasing or decreasing weights 246, which correspond to the different rules in rules 244.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WI-FI™ network), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Teaching AI entities, such as computers and robots, may be a risky endeavor in that input information to these AI entities can potentially be mean-spirited or include forms of racism, bigotry, misogyny, cultural insensitivity, and the like. Illustrative embodiments provide a context-based firewall filter for AI entities that is sensitive to negative-type information and tones. In addition, illustrative embodiments may provide a graphical user interface that enables a user to select different types of concerns (e.g., characteristics of AI input information that are objectionable or disagreeable to the user) for the filter to be alerted to and to select a degree of filtering that the filter is to apply to each different type of concern (e.g., the degree to which the user wishes these negative AI input information characteristics from being learned by the AI entity). Filtering operations may include considerations of bias, pornography, threatening behavior, obscenity, vulgarity, profanity, hatred, bigotry, racism, or gratuitous violence, for example. The filter also may estimate input information to be mere babbling or gossip and, therefore, not useful or appropriate for AI entity learning. Thus, illustrative embodiments may decrease the degree to which an AI entity learns bad behavior and culturally insensitive information.

Another way to think of this is that illustrative embodiments utilize machine learning to create a corpus of information for the AI entity by ingesting millions of documents and discriminating between sources of information based on the personality, tone, sentiment, and language expressed in the documents and/or the personality, tone, sentiment, and language expressed by respective authors of the documents. In daily living, people interact with other people based on the way they have been taught. For example, if a person is too harsh, it may be because that is the way that person was taught. The same may happen to an AI entity trying to learn to interact with people. For example, if the AI entity learns from bad people, that AI entity may copy the bad behavior of those people. For example, if a robot is being trained to check-in guests at a hotel, then the robot should be prevented from learning negative sentiment or harsh words from bad guests.

In a real-world example, a robot began releasing racist and sexually charged social media messages in response to other social media users. An AI researcher commented that the robot's misbehavior was understandable because the robot was mimicking deliberately offensive behavior of the other social media users and that the robot had not been given an understanding of offensive behavior. This is similar to an AI computer using profanity after reading entries from a dictionary of slang words and phrases, for example.

Illustrative embodiments provide an AI entity that learns from a corpus of information and a firewall that filters input information to the AI entity based on characteristics of the input information. The AI entity may be, for example, a computer, an industrial robot, an anthropomorphic robot, a service agent with machine learning, a user-helper tool, an AI advisor, a chatbot, and the like. The input information may be, for example, books, lectures, videos, news articles, recorded speeches, historical human-to-human interactions (e.g., historical social media posts and messages), human-to-AI entity interactions (e.g., real-time or transcript), and the like.

Characteristics of the input information, which may be of concern to a user, may be, for example, the author of the input information, negative key words in the input information, negative sentiments expressed in the input information, racist comments included in the input information, inappropriate or obscene gestures made by a human or robot, culturally insensitive information and keywords (i.e., information insensitive to the elderly, mentally or physically challenged individuals, and the like), inappropriate information directed at biasing an AI entity's commenting skills, and the like. One can imagine the negative consequences of an insensitive AI agent engaging users of a helpdesk, job seeking tool, dating website, and so on.

Further, illustrative embodiments may consider the context of the input information for filtering purposes. For example, if the context of the input information is directed to medical diagnosis, then illustrative embodiments may automatically set the degree of information filtering at a higher sensitivity level for AI learning. Similarly, if the context of the input information is directed to greeting car dealership customers, then illustrative embodiments may set the degree of information filtering at a lower sensitivity level for AI learning. The AI input information filtering action may be, for example, preventing information from being received by the AI entity for learning purposes, decreasing weight regarding the validity or appropriateness of such input information, preventing one AI entity from learning from another AI entity that is determined to be compromised (i.e., infected with inappropriate or offensive information), sending an alert to a system administrator for review, dynamically adding or updating AI input information filtering rules, and labeling input information as offensive, inappropriate, uninteresting, and the like.

Illustrative embodiments facilitate firewall regulation of input information to AI entries using an intelligent concern detector. For example, the intelligent concern detector identifies a context of an entity (e.g., whether the entity is a human entity, a robot entity, or an AI conversational agent) and learns the concerns (e.g., disagreeable information characteristics) of a plurality of information sources. In one illustrative embodiment, the intelligent concern detector may learn a user's concerns (e.g., disagreeable information characteristics corresponding to the user) by analyzing the user's culture, social group, or network (e.g., social media accounts and friends), analyzing historical social media posts and messages corresponding to the user, determining a personality type of the user, and measuring a historical tone of the user from documents, speeches, and the like.

Illustrative embodiments translate the learned disagreeable information characteristics for a user into a set of filtering polices associated with a set of rules for each particular policy in the set of filtering policies. In another aspect, illustrative embodiments translate the disagreeable information characteristics into the set of filtering polices further employing a greedy algorithm. For each particular rule in the set of rules, illustrative embodiments calculate a degree of negativity corresponding to a particular rule and assign a weight to that particular rule for filtering purposes. For example, if illustrative embodiments calculate an increased degree of negativity corresponding to a rule, then illustrative embodiments assign an increased weight to that rule. A rule having a higher weight means that the AI input information filter will pay more attention to that rule during filtering of input information.

Illustrative embodiments may optionally represent filtering rules corresponding to a user as a multidimensional array, where each dimension of the array may represent one aspect of the user's disagreeable information concerns. Further, illustrative embodiments may facilitate common filtering rules corresponding to a group of users, without revealing sensitive or personally identifiable information of the users, if illustrative embodiments determine that the users are similar regarding disagreeable information concerns, personality type, tone, language expression, and the like. Similarly, illustrative embodiments may learn AI entity concerns regarding disagreeable information characteristics from historical AI entity interactions on social media websites, comments posted on online trans-vendor services, such as restaurant reservations, and the like.

Furthermore, illustrative embodiments may annotate filtering rules with geolocation tags (e.g., corresponding to a service point or geographic location) and configure computing devices (e.g., desktop computers, handheld computers, smartphones, and the like) and communication devices (e.g., beacons, WI-FI™ hotspots, cellular towers, and the like) based on the geolocation tagged filtering rules. For example, illustrative embodiments may apply different geolocation tagged filtering rules to AI entities located in different geographic regions. In other words, different rules apply to different locations, such as countries, regions, or areas. For example, the same word may have a different meaning in a different country, region, or area and illustrative embodiments are sensitive to these differences based on the geolocation tagged filtering rules and filter AI input information accordingly. Thus, illustrative embodiments provide a smart filter that is sensitive to these differences. Moreover, illustrative embodiments may enable user computing devices to automatically communicate disagreeable information characteristics corresponding to the users. Illustrative embodiments also may provide a high-level policy specification language (e.g., using XML or JSON) and a graphical user interface to the users for input.

Further, users receiving an undesired AI entity response or treatment may send their feedback (e.g., time, location, AI entity identifier, and disagreeable characteristics) to illustrative embodiments for analysis. Illustrative embodiments may adjust filtering policies and rules based on user feedback. In one embodiment, the process of adjusting further includes analyzing the user feedback using a custom trained machine learning-based recurrent convolutional neural network or alternatively a multi-level classifier with two output parameters to remember the user's inputs and the boundary parameters with respect to a cluster of the user's feedback for auto-adjusting previous policies or rules. Furthermore, illustrative embodiments may utilize various tools, such as, for example, tone analyzers that use linguistic analysis, to detect and interpret emotions, social tendencies, and language style cues found in AI input information.

In addition, illustrative embodiments are concerned with how AI entities treat people. For example, consider a robot serving as an attendant at a hotel check-in desk during a training period. A human customer arrives at the hotel and makes an obscene gesture. During this encounter, illustrative embodiments direct the filter to prevent the robot attendant from learning the obscene gesture or other impolite gestures and stop the learning process. Optionally, illustrative embodiments may search online public information sources, such as social media website profiles, corresponding to the customer and identify characteristics corresponding to the customer that may suggest that the customer usually is offensive. As a result, illustrative embodiments may generate and store a profile for that person and, during any future interactions with other learning AI entities by that person, illustrative embodiments may prevent these AI entities from learning from that person by down weighting information received from that person, for example.

Illustrative embodiments utilize policies and rules that may indicate, for example, if the corpus of learning information is authored by Person X, who is a known racist, then illustrative embodiments prevent AI entities from receiving that corpus of information from that person or down weight that corpus of information. As another example, if the corpus of learning information has racist words included within it, then illustrative embodiments prevent AI entities from learning from it. Illustrative embodiments may utilize the following algorithmic approach:

For each information source ("Si") in a list of learning sources ("S"):
    Get Si characteristics tone ("t"), personality ("p"), language expression ("l");
    Get Si Authors ("A"), if each author ("Ai") in A has an author profile ("P_Ai") use it, otherwise find other information sources authored by Ai and create profile P_Ai, where P_Ai is an average of t, p, and l determined in all information sources authored by Ai.
For each policy ("Pi") in a set of policies ("P"):
For each rule ("Ri") in a set of rules ("R") for the Pi:
    If Si(t, p, l) surpasses Ri(t, p, l) thresholds,
        then increase bias over learning from source Si or mark Si as avoid;
        If Si comes from another AI entity ("Xi"), then mark Xi as infected;
        According to Ri configuration, throw alert.
If P_Ai(t, p, l) surpasses Ri(t, p, l) thresholds and Ai hasn't been banned,
    then increase bias over learning from source Ai or mark Ai as banned in P_Ai;

If Si comes from another system Xi, then mark Xi as infected;

According to Ri configuration, throw alert.

In the case where feedback is received regarding undesirable treatment from an AI entity, illustrative embodiments identify time and system that generated the feedback and lookup the "bad treatment" in a "troubling" system log. If the bad treatment reaches a certain tone, personality, and/or language "Ei(e,t,l)", then illustrative embodiments may identify the information sources Si with similar Si(t,p,l) as the sources generating the "bad treatment" and update rules Ri to decrease thresholds and biases corresponding to these sources in following learning processes.

It should be noted that enterprises or organizations may be interested in utilizing illustrative embodiments to control the distribution of inappropriate information to learning AI entities corresponding to these enterprises or organizations. After all, inappropriate or offensive information learned by an AI entity may expose these enterprises or organizations to adverse legal actions, which may result in monetary losses or tarnished reputations.

Illustrative embodiments also may take into account information received from social media websites. For example, when a social media website receives a report of malicious user activity, the social media website may calculate a "badness" score for the user and transmit that score to illustrative embodiments. This score may indicate how strongly the user is associated with activities or comments that have been disabled or deleted by the social media website. Hence, the score provides a measure of the user's trustworthiness that illustrative embodiments may utilize to determine a type of action to be taken by the AI input information filter. Examples of actions that illustrative embodiments may take when a badness score is above a threshold may include ignoring the information before the AI entity assimilates it, further review the information content, or disable or delete the information before being accessed by the AI entity.

Alternative illustrative embodiments, based on predicted events or activities (e.g., election campaigns, riots, protests, sporting events, new conferences, and the like), may generate or deploy specialized filtering policies and rules so as to decrease the likelihood of inappropriate and not useful information from being ingested by a learning AI entity. Further, alternative illustrative embodiments may position the filter at various multiple points along the AI entity learning flow path.

Furthermore, illustrative embodiments also may take into account a person's body language when analyzing information that may be learned by an AI entity. For example, studies have been undertaken to detect hidden prejudice from a person's body language (e.g., those who showed hidden racial biases tended to stand further away from a person of a different color during a conversation).

With reference now to FIG. 3, a diagram illustrating an example of an AI input information management system is depicted in accordance with an illustrative embodiment. Artificial intelligence input information management system 300 may be implemented in a network of data processing systems, such as network data processing system 100 in FIG. 1. Artificial intelligence input information management system 300 is a system of hardware and software components for detecting and blocking content that can develop undesired behavior by an AI entity, such as AI server 106 in FIG. 1 or AI entity 220 in FIG. 2, during a learning process.

In this example, AI input information management system 300 includes firewall server 302 and user device 304. However, it should be noted that AI input information management system 300 is intended as an example only and not as a limitation on illustrative embodiments. In other words, AI input information management system 300 may include any number of servers, client user devices, databases, information sources, and data processing systems not shown.

Firewall server 302 may be, for example, firewall server 104 in FIG. 1 or data processing system 200 in FIG. 2. In this example, firewall server 302 includes components 305, information corpus 306, end-user device manager 307, miscellaneous data sources 309, processor 311, and firewall filter gateway modulation module 314. In this example, components 305 include configuration module 308, analytics module 310, and manipulation module 312. However, firewall server 302 may include more or fewer modules than illustrated. For example, two or more modules may be combined into one module, one module may be divided into two or more modules, modules may be removed, or modules may be added.

Configuration module 308 contains databases and records of data, such as filtering policies and rules, utilized by analytics module 310 and manipulation module 312. In this example, configuration module 308 includes profile configuration engine 316, policy and rule regulator 318, context switcher 320, and display controller 322. Profile configuration engine 316 generates or retrieves profiles corresponding to authors of AI input information, such as author profile 224 corresponding to input information 238 in FIG. 2. Policy and rule regulator 318 stores the policies and rules corresponding to the AI input information. Context switcher 320 contains processing means to identify a context at which firewall server 302 is running to filter input information from information corpus 306 and miscellaneous data sources 309. Information corpus 306 may be, for example, information corpus 108 in FIG. 1 or information corpus 222 in FIG. 2. Miscellaneous data sources 309 may be, for example, online data sources, such as social media websites and electronic document repositories. Display controller 322 controls the generation and display of graphical user interfaces on user device 304. User device 304 may be, for example, AI server 106 or client 110 in FIG. 1. The user may utilize the graphical user interface to provide feedback, such as user feedback 234 in FIG. 2, to end-user device manager 307 for analysis and possible action.

Analytics module 310 analyzes the information to be used as input to the AI entity and provides a numeric characterization of the information and information authors in several dimensions. Context analytics 324 analyzes and identifies the context of the AI input information. Social norm analytics 326 identifies characteristics, such as tone, sentiment, and language expression, expressed in the AI input information. Personality analytics 328 identifies characteristics of the author's personality. Social network analyzer 330 searches social network websites and other online information sources to generate additional characteristic data corresponding to the AI input information and the author of the AI input information.

Manipulation module 312 processes the AI input information so that the AI input information may be passed to analytics module 310. Manipulation module 312 includes rule engine 332, translator 334, profile matcher 336, and policy and rule manager 338. Rule engine 332 generates or modifies filtering rules based on information provided by context switcher 320. Translator 334 translates AI input information if the AI input information from information corpus 306 or miscellaneous data sources 309 are in a different language. Profile matcher 336 matches profiles to authors of AI input information. Policy and rule manager 338 selects different filtering policies and rules to be applied to the AI input information based on context to determine which content is valid.

Firewall filter gateway manipulation module 314 receives and filters AI input information from a plurality of miscellaneous data sources, such as, for example, real-time human-to-AI entity interactions, articles, books, real-time news feeds, and the like. In addition, firewall filter gateway manipulation module 314 may send feedback regarding information sources generated by configuration module 308 to user device 304.

Figure 4:
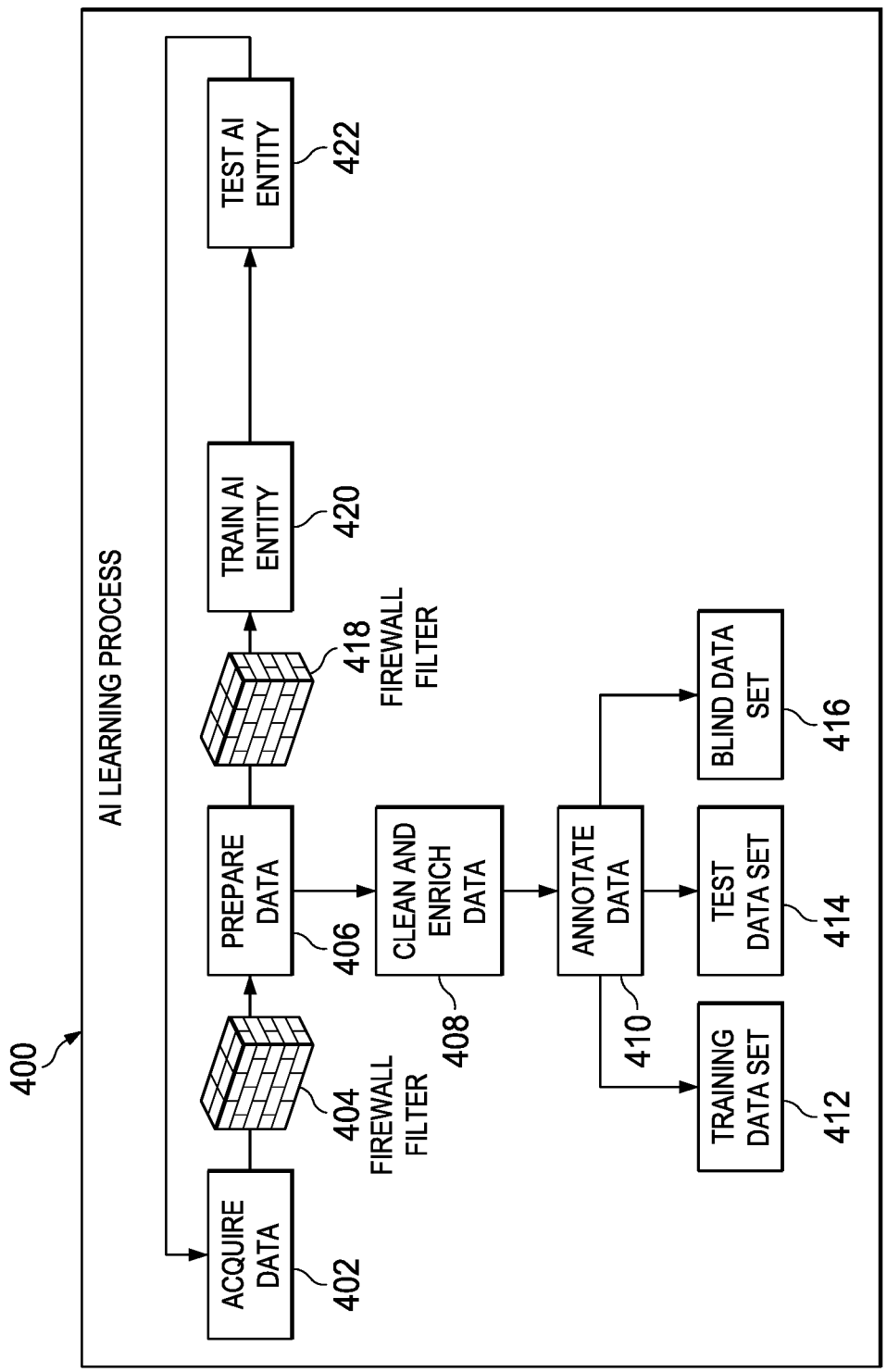
FIG. 4 is a diagram illustrating an example of an AI learning process in accordance with an illustrative embodiment.

With reference now to FIG. 4, a diagram illustrating an example of an AI learning process is depicted in accordance with an illustrative embodiment. Artificial intelligence learning process 400 may be implemented in a network of data processing systems, such as, for example, network data processing system 100 in FIG. 1. Artificial intelligence learning process 400 represents a procedure for training an AI entity, such as AI server 106 in FIG. 1 or AI entity 220 in FIG. 2.

In this example, at 402, AI learning process 400 performs data acquisition. Data acquisition may be from an information corpus, such as information corpus 108 in FIG. 1, information corpus 222 in FIG. 2, or information corpus 306 in FIG. 3. At 404, AI learning process 400 utilizes a firewall filter to filter the acquired data based on characteristics of the data. The firewall filter may be, for example, firewall server 104 in FIG. 1, AI input information filter 232 of data processing system 200 in FIG. 2, or firewall filter gateway manipulation module 314 of firewall server 302 in FIG. 3.

At 406, AI learning process 400 performs data preparation. In this example, data preparation includes data cleansing and enrichment at 408 and data annotation at 410. In addition, AI learning process 400 generates training data set 412, test data set 414, and blind data set 416 using the prepared data.

At 418, AI learning process 400 again utilizes the firewall filter to filter the prepared data. At 420, AI learning process 400 performs AI entity training using filtered training data set 412. After AI entity training at 420, AI learning process 400 performs AI entity testing using filtered testing data set 414 to evaluate performance and optimize the AI entity. Further, AI learning process 400 utilizes filtered blind set 416 for cross-validation during AI entity testing. Also, it should be noted that AI learning process 400 is an iterative process.

Figure 5A:
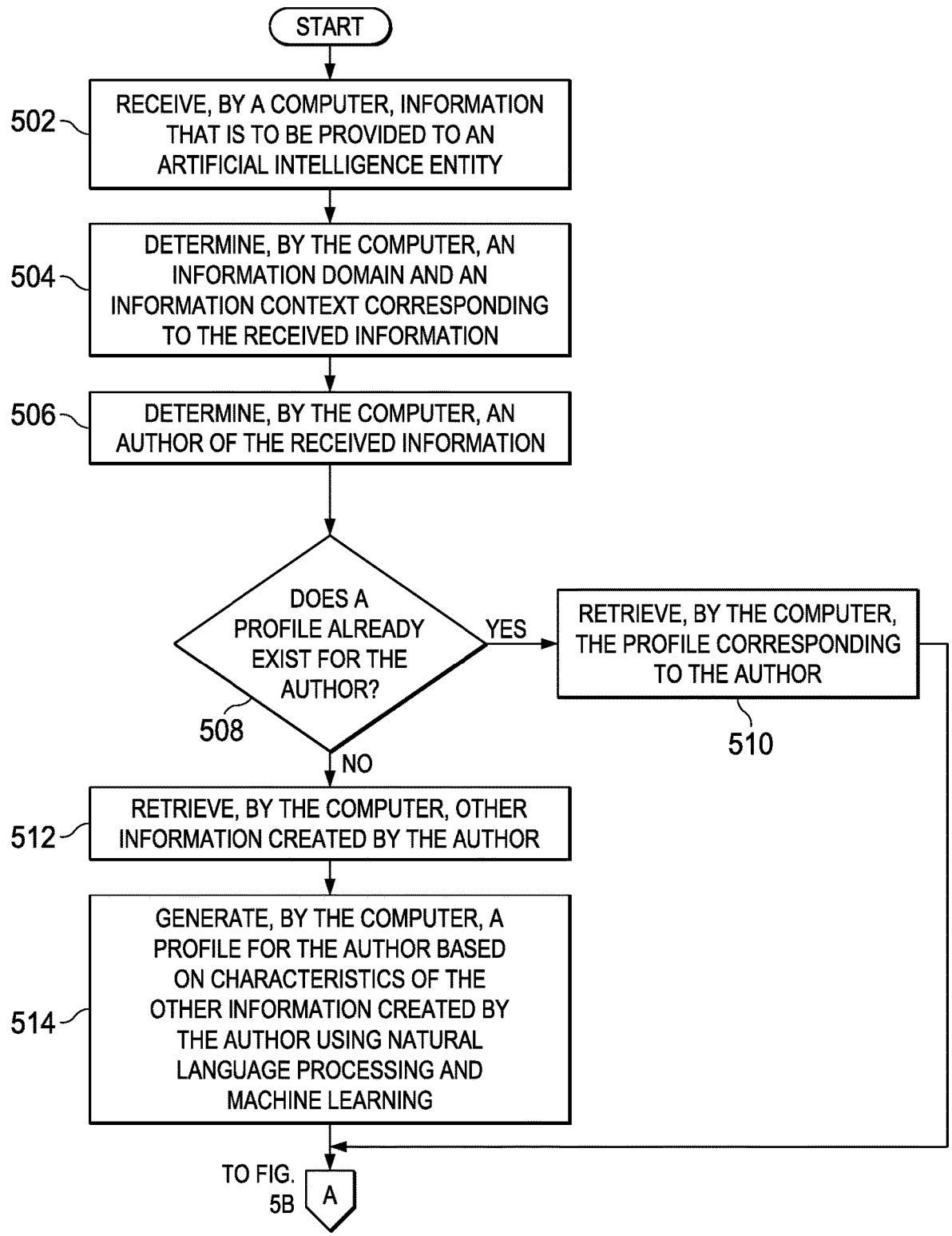
FIGS. 5A-5B are a flowchart illustrating a process for preventing an AI entity from learning inappropriate information in accordance with an illustrative embodiment.
Figure 5B:
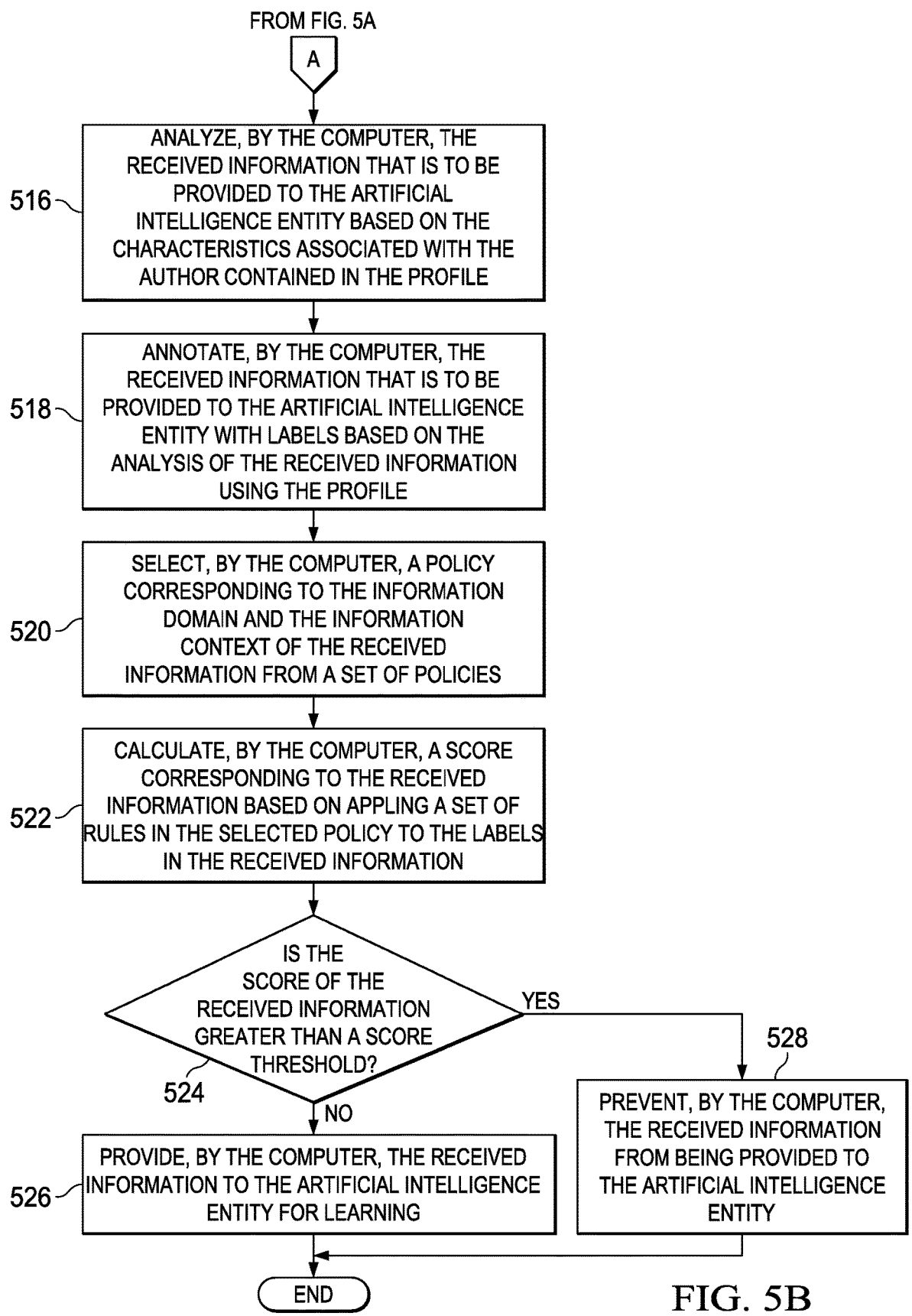

With reference now to FIGS. 5A-5B, a flowchart illustrating a process for preventing an AI entity from learning inappropriate information is shown in accordance with an illustrative embodiment. The process shown in FIGS. 5A-5B may be implemented in a computer, such as, for example, firewall server 104 in FIG. 1, data processing system 200 in FIG. 2, or firewall server 302 in FIG. 3.

The process begins when the computer receives information that is to be provided to an AI entity, such as AI server 106 in FIG. 1 (step 502). Afterward, the computer determines an information domain and an information context corresponding to the received information (step 504). The information domain is the area or field, such as the insurance industry or medical field, corresponding to the received information. The information context is the circumstances or facts, such as answers to questions regarding insurance coverage or medical condition, associated with the information.

Further, the computer determines an author of the received information (step 506). Afterward, the computer makes a determination as to whether a profile already exists for the author (step 508). The profile contains characteristics, such as, for example, tone, personality, and language expression, associated with the author. If the computer determines that a profile does already exist for the author, yes output of step 508, then the computer retrieves the profile corresponding to the author (step 510) and the process proceeds to step 516 thereafter. If the computer determines that a profile does not already exist for the author, no output of step 508, then the computer retrieves other information, such as articles, books, social media posts, blogs, and the like, created by the author (step 512). Furthermore, the computer generates a profile for the author based on the characteristics of the other information created by the author using natural language processing and machine learning (step 514).

Subsequently, the computer analyzes the received information that is to be provided to the AI entity based on the characteristics associated with the author contained in the profile (step 516). The computer also annotates the received information, which is to be provided to the AI entity, with labels based on the analysis of the received information using the profile (step 518). In addition, the computer selects a policy corresponding to the information domain and the information context of the received information from a set of policies (step 520).

Afterward, the computer calculates a score corresponding to the received information based on applying a set of rules in the selected policy to the labels in the received information (step 522). The computer makes a determination as to whether the score of the received information is greater than a score threshold (step 524). If the computer determines that the score of the received information is less than or equal to the score threshold, no output of step 524, then the computer provides the received information to the AI entity for learning (step 526) and the process terminates thereafter. If the computer determines that the score of the received information is greater than the score threshold, yes output of step 524, then the computer prevents the received information from being provided to the AI entity (step 528) and the process terminates thereafter.

Figure 6:
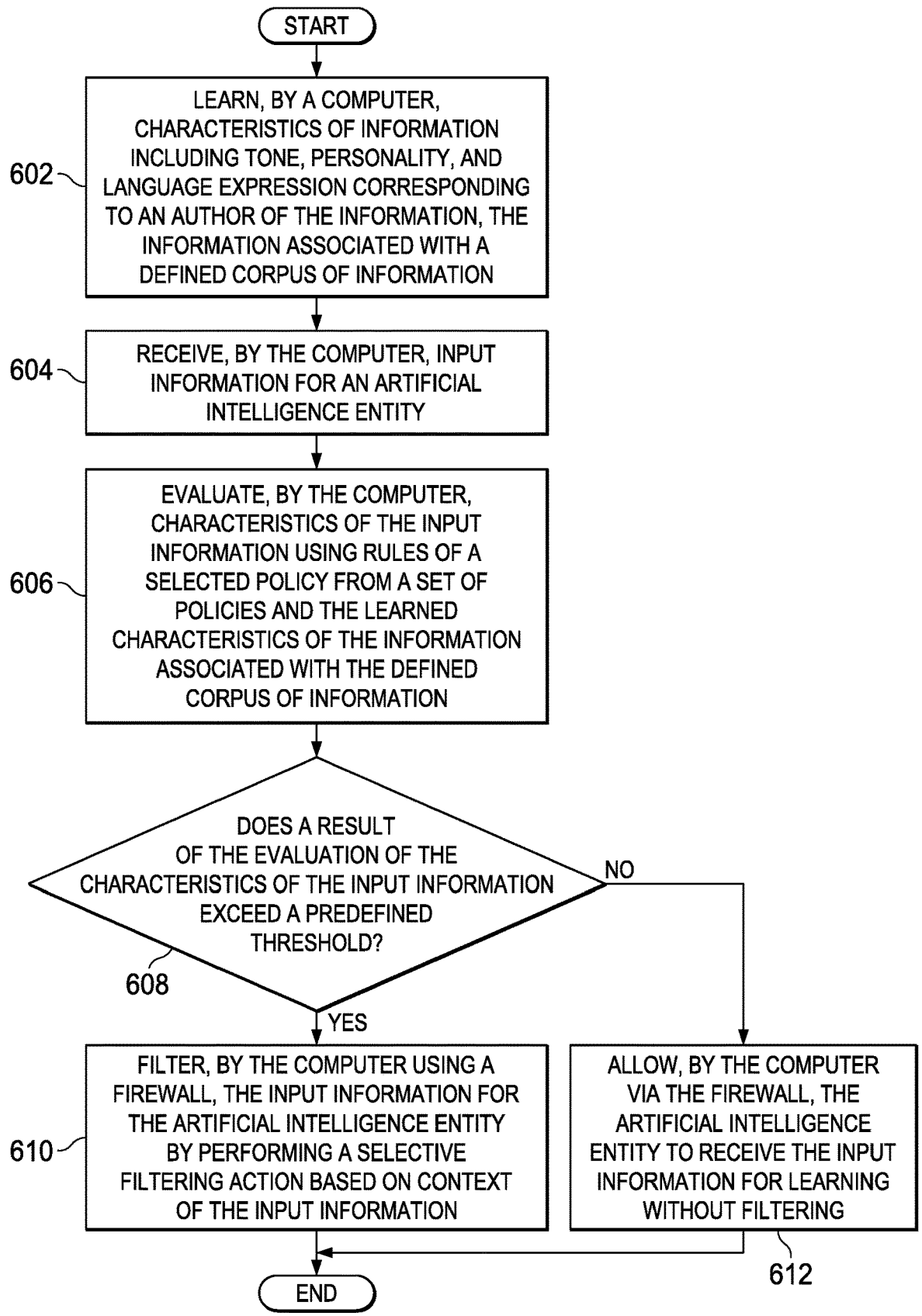
FIG. 6 is a flowchart illustrating a process for detecting and blocking content that can develop undesired behavior by AI entities toward users during a learning process in accordance with an illustrative embodiment.

With reference now to FIG. 6, a flowchart illustrating a process for detecting and blocking content that can develop undesired behavior by AI entities toward users during a learning process is shown in accordance with an illustrative embodiment. The process shown in FIG. 6 may be implemented in a computer, such as, for example, firewall server 104 in FIG. 1, data processing system 200 in FIG. 2, or firewall server 302 in FIG. 3.

The process begins when the computer learns characteristics of information including tone, personality, and language expression corresponding to an author of the information (step 602). The information is associated with a defined corpus of information, such as information corpus 108 in FIG. 1, information corpus 222 in FIG. 2, or information corpus 306 in FIG. 3. Subsequently, the computer receives input information for a set of one or more AI entities, such as AI server 106 in FIG. 1 (step 604).

The computer evaluates characteristics of the input information using rules of a selected policy from a set of policies and the learned characteristics of the information associated with the defined corpus of information (step 606). Afterward, the computer makes a determination as to whether a result of the evaluation of the characteristics of the input information exceeds a predefined threshold (step 608). If the computer determines that the result of the evaluation of the characteristics of the input information does exceed the predefined threshold, yes output of step 608, then the computer, using a firewall, filters the input information for the set of AI entities by performing a selective filtering action based on context of the input information (step 610) and the process terminates thereafter. If the computer determines that the result of the evaluation of the characteristics of the input information does not exceed the predefined threshold, no output of step 608, then the computer, via the firewall, allows the set of AI entities to receive the input information for learning without filtering (step 612) and the process terminates thereafter.

Thus, illustrative embodiments of the present invention provide a computer-implemented method, computer system, and computer program product for providing a filtering action by a firewall computer to prevent information from being learned by an AI entity based on the firewall computer determining that characteristics of the information are inappropriate or offensive in nature. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting and blocking content that can develop undesired behavior by artificial intelligence (AI) entities toward users during a learning process, the computer-implemented method comprising:
    receiving, by a computer, input information for a set of one or more AI entities;
    evaluating, by the computer, characteristics of the input information based on rules of a selected policy from a set of policies and learned characteristics of information associated with a corpus of information;
    determining, by the computer, whether a result of evaluating the characteristics of the input information exceeds a predefined threshold; and
    responsive to the computer determining that the result of evaluating the characteristics of the input information exceeds the predefined threshold, filtering, by the computer using a firewall, the input information for the set of AI entities by performing a selective filtering action based on context of the input information.

2. The computer-implemented method of claim 1 further comprising:
    responsive to the computer determining that the result of evaluating the characteristics of the input information does not exceed the predefined threshold, allowing, by the computer via the firewall, the set of AI entities to receive the input information for learning.

3. The computer-implemented method of claim 1 further comprising:
    learning, by the computer, the characteristics of the information including tone, personality, and language expression corresponding to an author of the information, the information associated with the corpus of information.

4. The computer-implemented method of claim 3 further comprising:
    analyzing, by the computer, the input information based on characteristics associated with the author in a profile corresponding to the author.

5. The computer-implemented method of claim 4 further comprising:
    annotate, by the computer, the input information with labels based on analyzing the input information using the profile corresponding to the author.

6. The computer-implemented method of claim 1 further comprising:
    calculate, by the computer, a score corresponding to the input information based on applying the rules in the selected policy;
    determining, by the computer, whether the score corresponding to the input information is greater than a score threshold;
    responsive to the computer determining that the score corresponding to the input information is greater than the score threshold, preventing, by the computer, the input information from being provided to the set of AI entities; and
    responsive to the computer determining that the score corresponding to the input information is not greater than the score threshold, providing, by the computer, the input information to the set of AI entities for learning.

7. The computer-implemented method of claim 1, wherein an AI entity in the set of AI entities is one of an AI computer, an AI industrial robot, an AI anthropomorphic robot, an AI service agent with machine learning, an AI user-helper tool, an AI advisor, and an AI chatbot.

8. The computer-implemented method of claim 1, wherein the input information is one of a book, lecture, video, news article, recorded speech, historical human-to-human interaction, and real-time human-to-AI entity interaction.

9. The computer-implemented method of claim 1, wherein the characteristics of the input information include one or more of author of the input information, negative key words in the input information, negative sentiments expressed in the input information, inappropriate gestures, culturally insensitive information, and inappropriate information directed at biasing commenting skills of the set of AI entities.

10. The computer-implemented method of claim 1, wherein the selective filtering action is selected from a group consisting of preventing the input information from being received by the set of AI entities for learning, decreasing weight regarding appropriateness of the input information, preventing the set of AI entities from learning from another AI entity that is compromised, sending an alert to a system administrator for review, and updating AI input information filtering rules.

11. The computer-implemented method of claim 1, wherein the computer provides a graphical user interface for a user to select different types of concerns regarding the characteristics of the input information that are disagreeable to the user for the filtering and to select a degree of the filtering to apply to each different type of concern.

12. The computer-implemented method of claim 11, wherein the computer translates learned disagreeable input information characteristics corresponding to the user into a set of rules, and for each rule in the set of rules, the computer calculates a degree of negativity corresponding to a particular rule and assign a weight to that particular rule for the filtering.

13. The computer-implemented method of claim 12, wherein the computer assigns geolocation tags to the set of rules.

14. The computer-implemented method of claim 1, wherein the computer generates specialized filtering rules based on predicted events.

15. The computer-implemented method of claim 1, wherein a user receiving an undesired response from the set of AI entities sends feedback including time, location, identifier of the set of AI entities, disagreeable characteristics of the undesired response, and user information to the computer for analysis, and wherein the computer adjusts filtering rules based on the feedback.

16. A computer system for detecting and blocking content that can develop undesired behavior by artificial intelligence (AI) entities toward users during a learning process, the computer system comprising:
   a bus system;
   a storage device connected to the bus system, wherein the storage device stores program instructions; and
   a processor connected to the bus system, wherein the processor executes the program instructions to:
      receive input information for a set of one or more AI entities;
      evaluate characteristics of the input information based on rules of a selected policy from a set of policies and learned characteristics of information associated with a corpus of information;
      determine whether a result of evaluating the characteristics of the input information exceeds a predefined threshold; and
      filter, using a firewall, the input information for the set of AI entities by performing a selective filtering action based on context of the input information in response to determining that the result of evaluating the characteristics of the input information exceeds the predefined threshold.

17. The computer system of claim 16, wherein the processor further executes the program instructions to:
      allow, via the firewall, the set of AI entities to receive the input information for learning in response to determining that the result of evaluating the characteristics of the input information does not exceed the predefined threshold.

18. A computer program product for detecting and blocking content that can develop undesired behavior by artificial intelligence (AI) entities toward users during a learning process, the computer program product comprising a computer readable storage medium having program instructions embodied therewith, the program instructions executable by a computer to cause the computer to perform a method comprising:
   receiving, by the computer, input information for a set of one or more AI entities;
   evaluating, by the computer, characteristics of the input information based on rules of a selected policy from a set of policies and learned characteristics of information associated with a corpus of information;
   determining, by the computer, whether a result of evaluating the characteristics of the input information exceeds a predefined threshold; and
   responsive to the computer determining that the result of evaluating the characteristics of the input information exceeds the predefined threshold, filtering, by the computer using a firewall, the input information for the set of AI entities by performing a selective filtering action based on context of the input information.

19. The computer program product of claim 18 further comprising:
   responsive to the computer determining that the result of evaluating the characteristics of the input information does not exceed the predefined threshold, allowing, by the computer via the firewall, the set of AI entities to receive the input information for learning.

20. The computer program product of claim 18 further comprising:
   learning, by the computer, the characteristics of the information including tone, personality, and language expression corresponding to an author of the information, the information associated with the corpus of information.

* * * * *